Oct. 5, 1926.

J. N. MARTIN

VARIABLE SPEED DRIVE

Original Filed July 3, 1924    2 Sheets-Sheet 2

1,602,161

INVENTOR
JOSEPH N. MARTIN
By Fetherstonhaugh & Co
Attorneys

Patented Oct. 5, 1926.

1,602,161

UNITED STATES PATENT OFFICE.

JOSEPH NOBLE MARTIN, OF TORONTO, ONTARIO, CANADA.

VARIABLE-SPEED DRIVE.

Application filed July 3, 1924, Serial No. 724,115. Renewed August 19, 1926.

My invention relates to improvements in variable speed drives, and the object of the invention is to devise simple means by which the speed of the driven shaft to the drive shaft may be varied to any ratio desired without the employment of the gear shift and consequent danger of gear stripping, and it consists essentially of a cylindrical casing in one head of which the driving shaft is journalled, and in the other head of which the driven shaft is journalled, and fluid control means located within the casing for forming a driving connection between the driving and driven shaft, as hereafter more particularly explained by the following specification.

In the drawings like characters of reference indicate corresponding parts in each figure.

Figure 1:
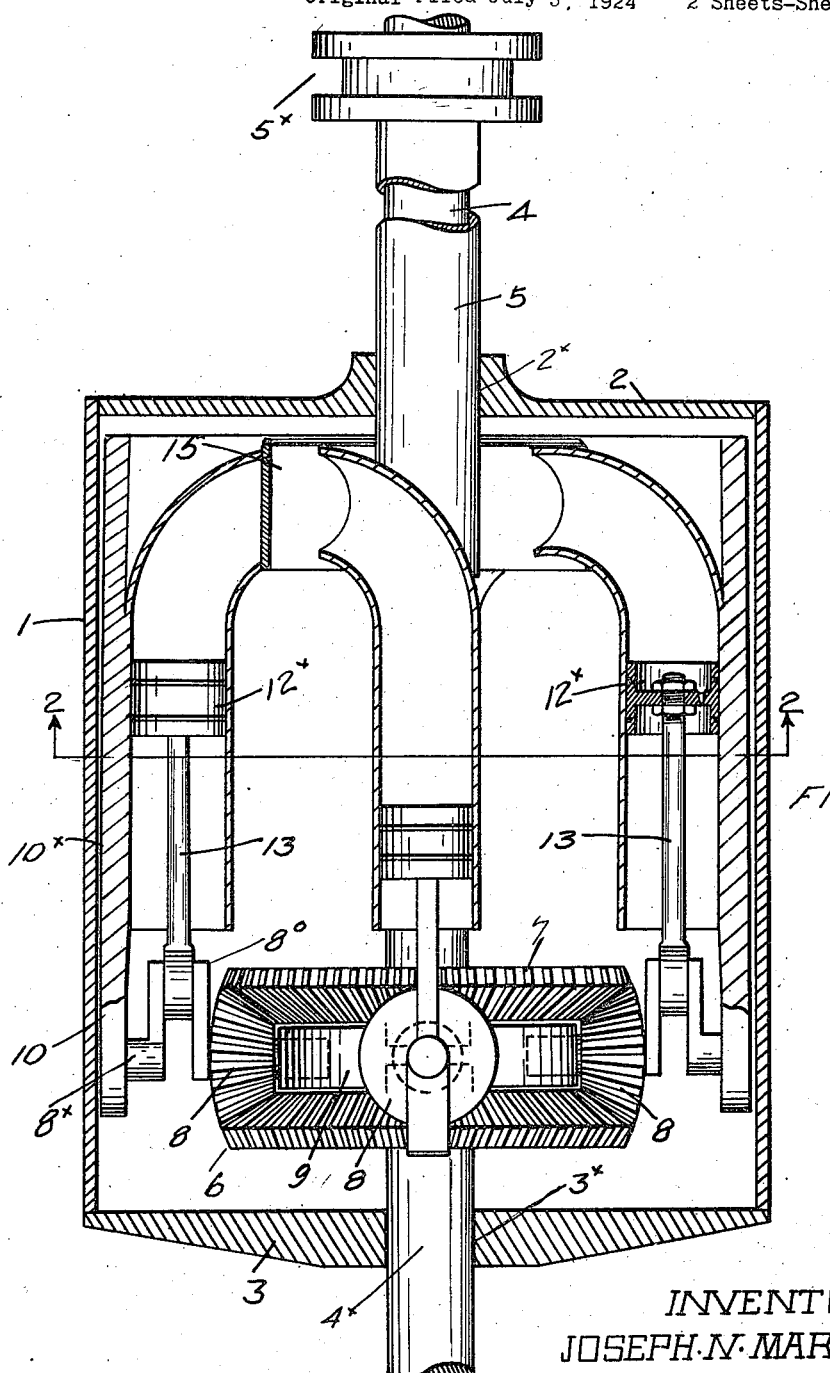
Fig. 1 is a sectional view taken on line 1—1, Fig. 2.
Figure 2:
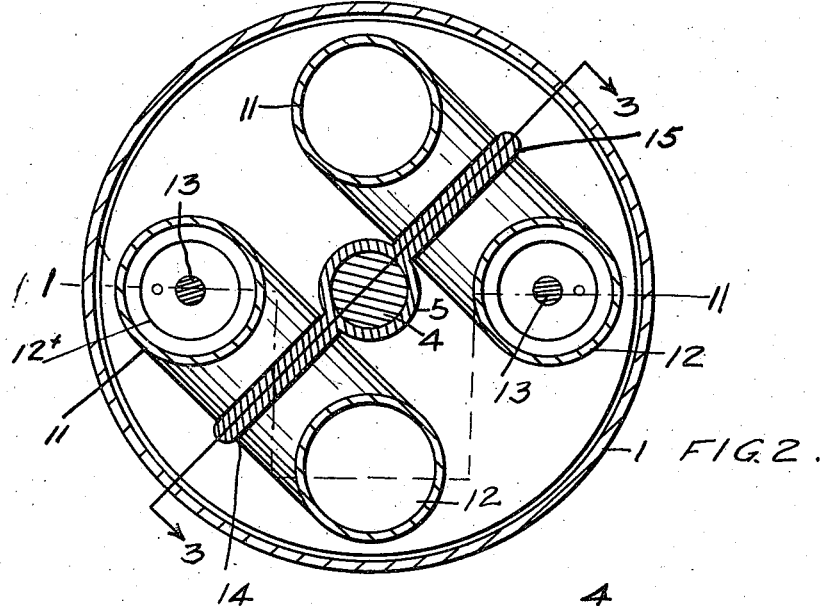
Fig. 2 is a sectional plan view on line 2—2, Fig. 1.
Figure 3:
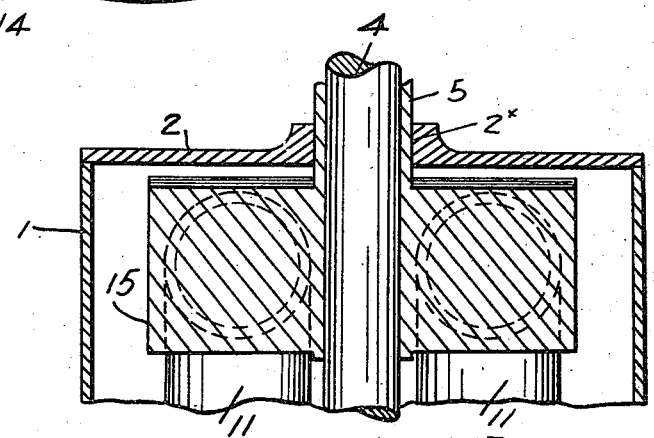
Fig. 3 is a sectional detail on line 3—3, Fig. 2.
Figure 4:
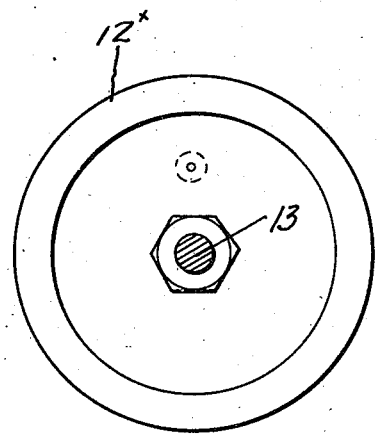
Fig. 4 is a detail plan view of one of the piston heads employed in my device.
Figure 5:
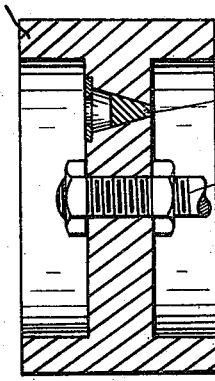
Fig. 5 is a sectional view through Fig. 4.

1 indicates a cylindrical casing provided with heads 2 and 3.

4 is a driving shaft upon which is slidably mounted a tubular shaft 5 which is journalled in the bearing orifice $2^x$ of the head 2. A driven shaft $4^x$ is journalled in the bearing orifice $3^x$ of the head 3.

6 is a differential gear secured to the driven shaft $4^x$. 7 is a differential gear opposing the gear 6 and secured to the driving shaft 4.

8 are planetary pinions, the shafts $8^x$ of which are journalled in the frame 9, each shaft being provided with crank arms $8^o$.

10 is an annular frame in which the opposite or outer ends of the shafts $8^x$ are journalled.

11 and 12 are tubes curved at one end so as together to form a U, the arms of which are formed integral with the frame 10, as indicated at $10^x$ in Fig. 1.

$12^x$ are pistons. A piston $12^x$ operates within each arm of the U shaped tubes 11 and 12, each piston being connected by a piston rod 13 to a corresponding crank arm $8^o$. Each of the U shaped tubes are divided intermediately in the base of the U forming a slotted opening 14 in which operates a gate valve which I will now describe.

15 are wings extending outward from the shaft 5 at diametrically opposite sides, such wings extending normally into the slotted openings 14 to form a closure between the open lower ends of the tubes 11 and 12.

It will be understood that the casing 1 is filled with oil or other suitable fluid which also fills the tubes 11 and 12, the entire mechanism comprising the annular member 10, tubes 11 and 12, differential gears, crank arms $8^o$ and pistons $12^x$ running in the oil.

When the gate valve 15 is in the closed position or the position shown in the drawing, the flow of oil from one arm of the U shaped tube 11 or 12 to the other arm is entirely cut off and therefore the pistons $12^x$ are locked from movement by the oil compressed between them and the gate valve and thereby preventing the movement of the piston rods 13, cranks $8^o$ and planetary pinions 8 which are thereby locked between the gears 9 and 7 and thereby locking the driving shaft 4 to the driven shaft $4^x$ so that they rotate in unison or in one to one ratio.

The sleeve 5 is provided with an annular grooved collar $5^x$ which is engaged by the operating lever so as to adjust the sleeve to any desired position and thereby adjust the gate valve to a more or less withdrawn position between the inner opposing ends of the members of the tubes 11 and 12. When the gate valve is partially withdrawn, a controlled flow of oil is provided varying in proportion to the distance to which the gate valve is opened from one arm of each tube 11 or 12 to the other arm of each tube 11 or 12, thereby controlling the movement of the pistons $12^x$ within such arms, and thereby varying the driving ratio between the drive and driven shafts. When the gate valve is fully opened the driving connection between the drive and driven shafts is broken.

By moving the gate valve inward so as to choke the flow of oil to a greater or less extent between the members of the tubes 11 and 12, the reciprocation of the pistons $12^x$ is impeded, and thereby decreases the rotation of the planetary gears 8 so as to decrease the speed ratio between the gears 6 and 7 and the driving and driven shafts 4 and $4^x$.

By this means it will be readily seen that any driving speed between the driving and driven shaft may be provided without any gear changing and consequent danger of stripping gears and other disadvantages which occur through the employment of the usual change gears.

In order to break any vacuum which might be formed between the gate valve 15 and the pistons 12ˣ, I provide a valve 16 which may be of any suitable form. Such valve will be forced to the open position during the return or suction stroke, so as to permit the oil to pass from one side of the piston to the other during such return or suction stroke, and to the closed position during the forward or compression stroke to prevent such passage of oil during such forward or compression stroke.

What I claim as my invention is:

In a variable speed drive, the combination with a driving shaft and driven shaft, of a closed fluid containing housing into which the driving and driven shaft extend, differential gear mechanism connecting the driving and driven shaft provided with planetary pinions, an annular frame surrounding the differential gear mechanism, shafts for the differential pinions journalled at their outer end in the annular frame, a pair of U-shaped tubular members extending longitudinally of the housing and set at right angles one to the other, a piston located in the arm of each tubular member, a driving connection between each piston and each differential pinion shaft adapted to move one pair of pistons located in the diametrically opposite tubular arms together in the same direction, and the other pair located in the other tubular arms set at right angles to the aforesaid tubular arms together in the opposite direction, and means for controlling the flow of fluid from one arm of one pair into the corresponding arm of the other pair adapted to vary the resistance of the fluid in each tubular arm during the compression stroke of the piston.

JOSEPH NOBLE MARTIN.